United States Patent [19]

Dixon et al.

[11] 3,792,452

[45] Feb. 12, 1974

[54] MAGNETIC DEVICES UTILIZING ION-IMPLANTED MAGNETIC MATERIALS

[75] Inventors: Melvyn Dixon, Allentown, Pa.; Robert Alan Moline, Gillette, N.J.; James Clayton North, New Providence, N.J.; Lawrence John Varnerin, Jr., Watchung, N.J.; Raymond Wolfe, New Providence, N.J.

[73] Assignee: Bell Telephone Laboratories Incorporated, Murray Hill, N.J.

[22] Filed: June 10, 1971

[21] Appl. No.: 151,728

[52] U.S. Cl. ....... 340/174 TF, 252/62.56, 252/62.57

[51] Int. Cl. ........................................... C11c 11/14

[58] Field of Search.... 340/174, 174 TF; 252/62.56, 252/62.57

[56] References Cited

UNITED STATES PATENTS 3,699,547 10/1972 Owens et al. ................ 340/174 TF 3,643,238 2/1972 Bobeck et al. ............... 340/174 TF

OTHER PUBLICATIONS

Applied Physics Letters Vol. 19, No. 8 Oct. 15, 1971 pg. 298–300.

The Bell System Technical Journal, July–August 1972 pgs. 1,436–1,440.

*Primary Examiner*—James W. Moffit

*Attorney, Agent, or Firm*—W. L. Keefauver; Edwin B. Cave

[57] ABSTRACT

Magnetic anisotropy in oxidic magnetic materials is altered by strain which is induced by local expansion of the lattice through ion implantation. This compressional strain in the instance of a material having positive magnetostriction may result in an enhanced magnetic easy direction normal to a major surface. Exemplary rare earth iron garnet materials have been so processed as to result in a thin surface region having appropriate magnetic properties for incorporation in "bubble" devices.

22 Claims, 2 Drawing Figures

PATENTED FEB 12 1974 3,792,452

INVENTORS
M. DIXON J.C. NORTH
R.A. MOLINE L.J. VARNERIN, JR.
R. WOLFE
BY George S. Indig
ATTORNEY

MAGNETIC DEVICES UTILIZING ION-IMPLANTED MAGNETIC MATERIALS

BACKGROUND OF THE INVENTION

1. Field of the Invention

The invention is concerned with magnetic bubble devices. Such devices, which depend for their operation on the nucleation and/or propagation of small enclosed magnetic domains of polarization opposite to that of the immediately surrounding material, may perform a variety of functions including switching, memory, logic, etc.

2. Description of the Prior Art

The last two years has seen significant interest develop in a class of magnetic devices known generically as "bubble" domain devices. Such devices described, for example, in IEEE Transactions, MAG-5 (1969), pp. 544–553 are materials which have magnetically easy directions essentially perpendicular to the plane of the structure. Magnetic properties, e.g., magnetization, anisotropy, coercivity, mobility, are such that the device may be maintained magnetically saturated with magnetization in a direction out of the plane and that small localized regions of polarization aligned opposite to the general polarization direction may be supported. Such localized regions, which are generally cylindrical in configuration, represent memory bits. Interest in devices of this nature is, in large part, based on high bit density. Such densities, which are expected to reach $10^5$ bits or more per square inch of wafer, are, in turn, dependent on the ability of the material to support such localized regions of sufficiently small dimension.

In a particular design directed, for example, to a $10^6$ bit memory, bubble domains of the order of 1/3 mil in diameter are contemplated. A $10^5$ bit memory may be based on stable domains three times greater, and a $10^7$ bit memory requires stable bubble domains three times smaller.

Commercial fruition to date has been impeded more by material than by design considerations. A first concern which had to do with composition has, through a series of extensive experiments, culminated in classes of oxidic magnetic materials which have appropriate device properties. At this time interest is largely centered on rare earth-containing iron garnets. Requisite unique anisotropy may be growth-induced or strain-induced in this otherwise magnetically cubic material.

First announced devices utilizing garnet material depended upon flux-grown bulk crystals. Depending upon a variety of considerations, including growth direction, occupancy of dodecahedral sites, etc., it was found possible to select slices of a variety of orientations which evidence the appropriate anisotropic properties. See Vol. 17, Applied Physics Letters, p. 131 (1970), and Vol. 42, Journal of Applied Physics, p. 1,641 (1971).

While slices selected from bulk-grown crystal continue to be of interest, other considerations have resulted in increasing emphasis on epitaxial layers. This emphasis arises from the desire for high packing density and the concomitant requirement that effective layer thickness be of the same dimensional order as the diameter of an individual bubble. A variety of techniques for growing epitaxial layers has developed. Some depend upon strain-induced unique anisotropy; others on growth-induced anisotropy. Both procedures are being pursued.

Economic considerations as well as development of more sophisticated devices are responsible for continuing search for fabrication techniques.

SUMMARY OF THE INVENTION

In accordance with the invention, inhomogeneous lattice expansion of magnetic materials (materials evidencing net magnetic spontaneous polarization — ferromagnetic, ferrimagnetic, canted spin antiferromagnetic) induced by ion implantation results in a tailoring of magnetic anisotropic properties. Such expansion, which may, for example, take place within the entirety or but a portion of a surface region, may be utilized to produce a unique easy direction normal to such surface from a bulk material evidencing an easy direction parallel to the surface or, indeed, from a material which is magnetically isotropic or cubic. Other uses include tailoring the magnitude of such aniostropy and the production of such effects, or of opposite effects in isolated surface regions, or in buried layers. Devices depending for their operation on such modified anisotropy constitute an aspect of the invention. The use of hydrogen ions for implantation is considered expedient and procedures utilizing this ionic species constitute a preferred embodiment. Oxidic magnetic materials such as those of the garnet structure because of their device properties, are of particular interest.

DETAILED DESCRIPTION

1. The Figures

Figure 1:
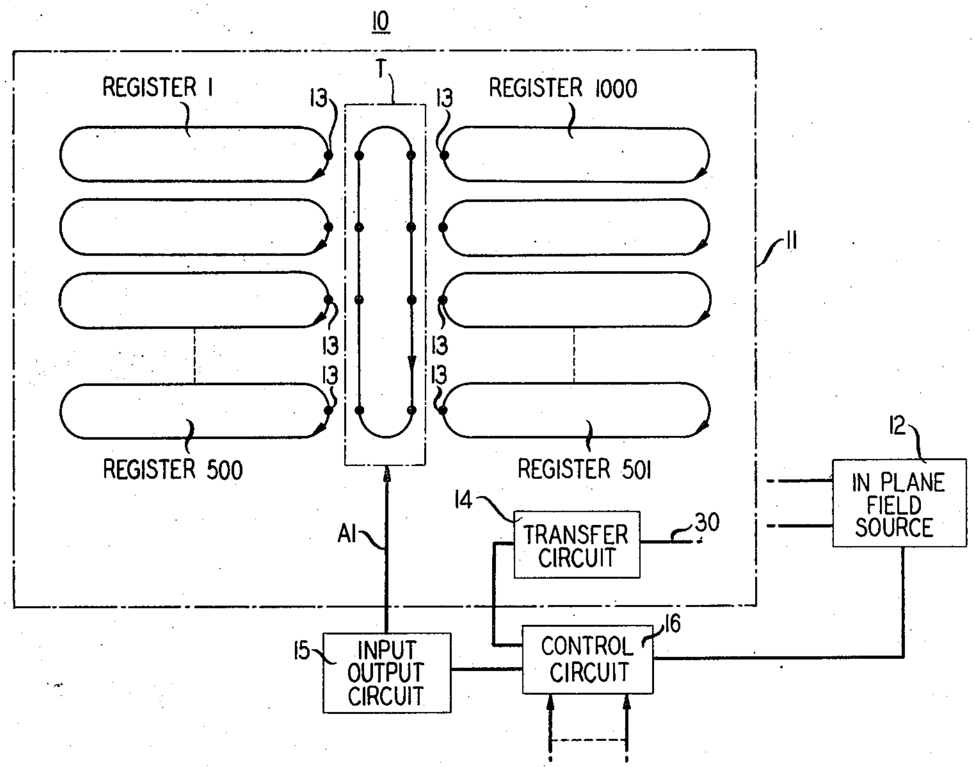
FIG. 1 is a schematic diagram of a recirculating memory depending upon the nucleation and propagation of bubbles in a magnetic material having an anisotropy modified in accordance with the inventive process.
Figure 2:
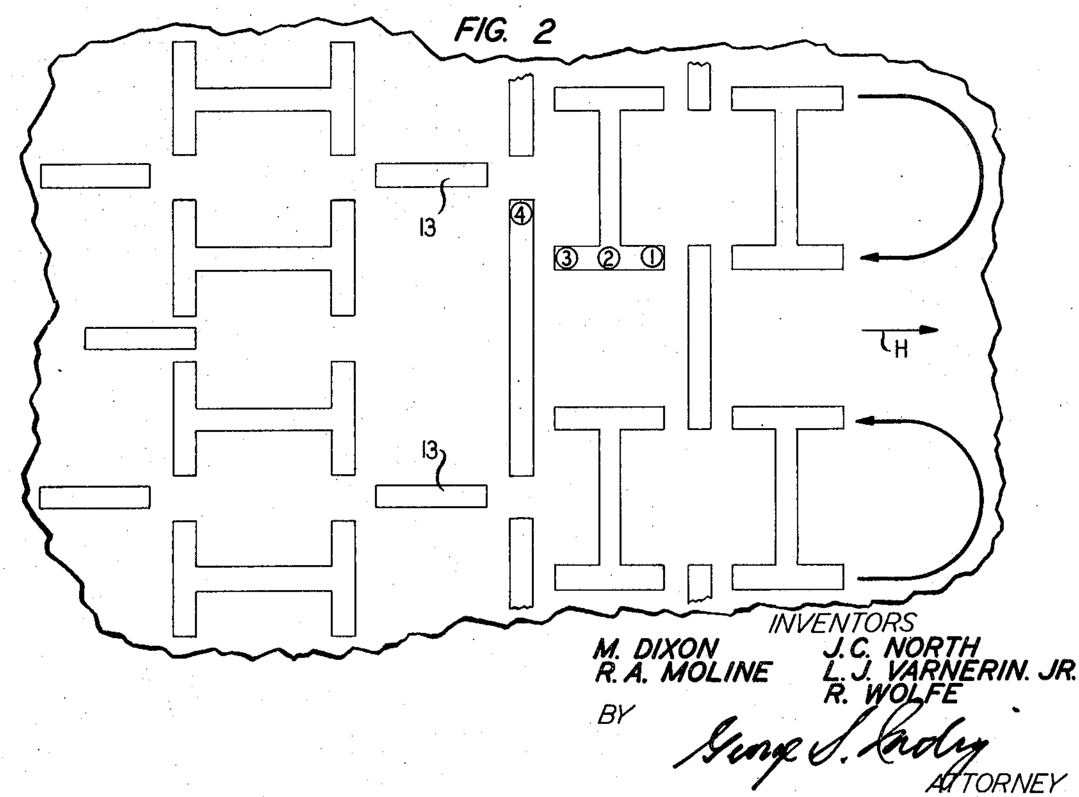
FIG. 2 is a detailed view of a portion of magnetic circuit pattern and wiring configuration for the memory of FIG. 1 showing domain locations during operation.

The device of FIGS. 1 and 2 is illustrative of the class of "bubbles" devices described in IEEE Transactions on Magnetics, Vol. MAG-5 No. 3, September 1969, pp. 544–553 in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of developement of the bubble devices and includes some details which have been utilized in recently operated devices.

FIG. 1 shows an arrangement 10 including a sheet or slice 11 of material in which single wall domains can be moved. The movement of domains in accordance with this invention is determined by high permeability paths such as may be determined by patterns of magnetically soft overlay material in response to reorienting in-plane fields. For purposes of description, the overlays are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions (13) where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the movement of the absence of a domain representing a binary zero.

FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portion of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above mentioned application of Bobeck. Instead, the consecutive positions from the right as viewed in FIG. 2, for a domain adjacent the vertical channel preparatory to a transfer operation are described. A domain in position 4 of FIG. 2 is ready to begin its transfer cycle.

The device depicted is, of course, intended to be illustrative only. A more complete description, including a variety of types of devices, is contained in the IEEE reference noted. Description of the particular device of the figures is consistent with the usual variety of bubble memory in which bubbles are nucleated and propagated at the surface either of a bulk wafer or within an epitaxially grown layer. The high permeability pattern which dictates the behavior of bubbles in such devices results from use of an overlay of a soft magnetic material such as supermalloy.

The depicted device is intended to be illustrative of a number of variations. So, for example, the depicted behavior may be that of bubbles which are not at a surface region but possibly in an imbedded region. Detailed behavior of such bubbles may be responsive to magnetic inhomogeneities either in or near the surface or in imbedded regions. So, for example, appropriate anisotropy may be induced only locally; may be reduced locally (so increasing mobility); related isolated regions within a given layer or within successive layers (corresponding with different depths); may be affected differently so as to ease generation of bubbles or so as to produce interacting bubble behavior, etc.

As is described under "Processing", any such desiderata may be accomplished by regulating the implantation dose or energy so as to concomitantly affect local magnetic properties. For example, increasing the applied voltage during implantation may result in a relatively large magnitude effect at an imbedded position. Other useful techniques for tailoring magnetic properties include masking and directional control (so as to prefer or minimize channeling, etc.).

2. Processing

From a generic standpoint, all improvisions, in accordance with the invention, are dependent upon ion implantation. The effect of the ion implantation which is of largest significance is attributed to a change in lattice parameter, generally an expansion in lattice parameter. This change in magnetic properties is brought about only where such expansion is inhomogeneous. The effect is a strain effect and it is considered that the expansion is the direct cause of such strain in that compression or extension of the implanted or, alternatively, the nonimplanted material results. Smaller changes in magnetic properties may be associated with other mechanisms, e.g., change in composition.

It is apparent from the above description that materials suitably processed to produce major effects in accordance with the invention must manifest a nonzero value of magnetostriction, and this is discussed at some length in the succeeding section entitled "Material Requirements." Generally, where magnetostriction is positive in sign and where the thickness of implanted material is small relative to the remainder, the use of material having a positive sign of magnetostriction results in the creation of or the increase in magnitude of a unique magnetic anisotropy orthogonal to the surface being treated. Expansion of the lattice of a material having a negative sign of magnetostriction results in the opposite effect, i.e., creation of an easy direction in the plane of the surface being treated or; for moderate dosage or small magnetostrictive constant, in reduction of the magnitude of a unique magnetic anisotropy normal to the surface. As has been indicated, all such effects may be produced homogeneously or nonhomogeneously, may be produced in layers very close to free-surface regions or layers which are buried. An implantation with a gradient in dosage or other discontinuity in dosage may be utilized to produce adjacent regions of differing magnetic properties.

The specific examples included as part of this disclosure utilize hydrogen as the implanted ionic species. Other materials which have the effect of expanding the lattice may be substituted. Experiment has shown that only selected materials are effective in producing a large scale effect attributable to a permanent expansion, and it is believed that this effect requires chemical reaction of the implanted species. Accordingly, it has been found that helium, which apparently does not react with the materials of concern (generally oxidic compounds), does not produce expansion at least of a magnitude sufficient to be of device interest. It is likely that other species such as, for example, lithium, although requiring somewhat greater energy than hydrogen, may produce similar effects. There is a wealth of literature dealing with the subject of ion implantation to which useful reference may be had for determining the range energy relationships for various ionic species. See, for example, "Ion Implantation in Semiconductors" by J. W. Mayer and O. J. Marsh, in Applied Solid State Science, Volume 1, ed. R. Wolfe, Academic Press, 1969.

The implantation process itself may be carried out in conventional apparatus. Such apparatus may consist of a high voltage generator, a suitable ion source such as a confined radio frequency plasma of a gas containing the desired ionic species, generally although not necessarily a means for collimating the beam (this is particularly useful in inventive species in which it is desired to produce channeled implantation), a suitable deflection system for rastering the beam to produce a uniform dose over the implanted area, and an electromagnet for selecting the desired ionic species from the accelerated beam. The specimen to be processed, as well as the foregoing apparatus, is generally maintained at a vacuum level of the order of $10^{-5}$ mm mercury. In general, it is desirable to provide means for controlling the temperature of the specimen being processed so, for example, to prevent overheating. (Since the effects of the inventive processing may be removed by annealing at temperatures of the order of 900° C for relatively short periods, suitable processing usually requires maintenance of the specimen at temperatures substantially below this level during processing--to this end, it is desirable to maintain the specimen at temperatures below 200° C.)

The various processing parameters, e.g., ionic velocity, dosage, etc., depend, inter alia, on the material being processed, on the desired depth of penetration, on the desired magnitude of change (creation, increase or decrease in anisotropy), etc. In this context, it is generally observed that energies from 10 keV to millions of electron volts are usable. The lower limit is prescribed by the observation that lesser energies produce effects that, while measurable, are of normal device interest. The upper limit, on the other hand, is dictated primarily by practical considerations such as economics of apparatus design, etc. Within the described range, the value chosen is dictated largely by the desired depth of penetration, of course, depending upon the ionic species specificed. So, for example, it is found that for the preferred class of proton implantation penetration depth of the order of 1 micrometer is easily accomplished by energies of the order of 100 keV while depths of the order of 10 micrometers are accomplished by use of energies of the order of 1 MeV. As is well known to those familiar with implantation, similar penetration depths for larger ionic species require greater energies.

The profile of expansion produced by implantation is dependent upon the energy spectrum. So, for example, where it is desired to produce a sharply defined buried region and where such buried region is to be produced at a depth of about 5 micrometer, a narrow energy spectrum at about 500 keV may be utilized. Alternatively, a thicker imbedded (or surface) layer results from a wider energy spectrum. As an example, a spectrum of the order of 500 keV ± 250 keV may, under appropriate circumstances, produce a layer thickness of the order of 5 micrometers, the entirety of which manifests a device-significant change in anisotropy.

The actual expansion attained at any given energy is dependent upon the number of implanted ions. This number is commonly expressed in terms of dosage, generally in units of total number of ions implanted per square centimeter of area. Examples which form a part of this disclosure are chosen from a series of experiments which utilize dosage in these units of from about $1 \times 10^{15}$ to about $1 \times 10^{18}$. Of course, dosage is interdependent on the energy spread utilized and somewhat larger doses may be useful, particularly for broad energy spectra and particularly for energy levels sufficient to result in penetrations greater than 1 or 2 micrometers.

It has been indicated that implantation may be carried out homogeneously or imhomogeneously. Various device objectives so served are apparent. Selection of areas to be primarily effected may be accomplished in a number of ways, for example, either by masking with materials which stop the incident ions or merely by properly directing or scanning with a well collimated beam. The angular directional aspect of the latter has to do with the use of channeling directions for the particular material being processed. Accordingly, a small change in direction of the impinging beam so as to produce a relatively small deviation from a channeling direction may have a relatively large effect on the penetration depth. Channeling directions for oxidic materials, for example, for garnet materials, generally corresponds with simple axial crystallographic directions of high symmetry, e.g., <100>, <111>, or <110>.

3. Material Requirements

In general, materials suitably processed have included oxidic magnetic materials of high symmetry and relatively low unique crystalline anisotropy (at least in their prototypical form). Exemplary materials include a large variety of compositions having the garnet or spinel ferrite structure. Such materials are traditionally considered to be magnetically cubic and, under ordinary circumstances, may evidence uniaxial magnetic anisotropy only due to extraneous effects such as shape, strain, or nonrandom distribution of cations populating a given crystallographic site. The effect of the implantation procedures herein operates primarily with the strain mechanism. Materials beneficially processed include those which are essentially cubic as well as those in which such directionality has been instilled. Where directionality is the result of strain, implantation, in modifying the strain, may increase or decrease or, indeed, change the direction of the already present anisotropy. Where directionality is "growth induced", implantation may modify, oppose, or negate such anisotropy. Since growth-induced unique anisotropy may generally be reduced or removed by annealing, usually at temperatures of the order of 1,000° C or higher, such annealing may constitute a step preliminary to an implantation procedure in accordance with the invention.

The overriding requirement for materials processed in accordance with the invention to produce major effects in anisotropy is a net magnetostriction sufficient to produce a change in magnetic properties having device significance with a feasible dosage. From this standpoint, magnetostrictions of a minimum of about $1 \times 10^{-5}$ usually suffice to produce anisotropy changes of the order of about $1 \times 10^3$ ergs per cc. This value of magnetostriction is considered to be a minimum for the inventive purposes since lesser net values are not generally sufficient to produce changes of device significance. There is no prescribed maximum since it is always possible to reduce the magnitude of the effect simply by maintaining the dosage within prescribed limitations.

To a first and sufficient approximation, composition evidencing the required magnetostrictions may be prescribed merely by setting a site population such that an assumed linear relationship with ionic magnetostrictive value results in a net value of at least the low limit of $1 \times 10^{-6}$, set forth above.

Relevant information is available in the literature, see, for example, Vol. 17, Applied Physics Letters, p. 131 (1970). Information of particular interest with respect to bubble devices is set forth in the following Table 1 which indicates magnetostrictive values for variations of the rare earth cations which may occupy the dodecahedral site in garnet materials currently of interest.

TABLE 1

Room Temperature Garnet Data

| | $\lambda_{111}$ | $\lambda_{100}$ |
|---|---|---|
| $Sm_3Fe_5O_{12}$ | $-8.5 \times 10^{-6}$ | $+21.0 \times 10^{-6}$ |
| $Eu_3Fe_5O_{12}$ | $+1.8 \times 10^{-6}$ | $+21.0 \times 10^{-6}$ |
| $Gd_3Fe_5O_{12}$ | $-3.1 \times 10^{-6}$ | $0.0 \times 10^{-6}$ |
| $Tb_3Fe_5O_{12}$ | $+12.0 \times 10^{-6}$ | $-3.3 \times 10^{-6}$ |
| $Dy_3Fe_5O_{12}$ | $-5.9 \times 10^{-6}$ | $-12.5 \times 10^{-6}$ |
| $Ho_3Fe_5O_{12}$ | $-4.0 \times 10^{-6}$ | $-3.4 \times 10^{-6}$ |
| $Y_3Fe_5O_{12}$ | $-2.4 \times 10^{-6}$ | $-1.4 \times 10^{-6}$ |
| $Er_3Fe_5O_{12}$ | $-4.9 \times 10^{-6}$ | $+2.0 \times 10^{-6}$ |
| $Tm_3Fe_5O_{12}$ | $-5.2 \times 10^{-6}$ | $+1.4 \times 10^{-6}$ |
| $Yb_3Fe_5O_{12}$ | $-4.5 \times 10^{-6}$ | $+1.4 \times 10^{-6}$ |
| $Lu_3Fe_5O_{12}$ | $-2.4 \times 10^{-6}$ | $-1.4 \times 10^{-6}$ |

W. H. Von Aulock, Handbook of Microwave Ferrite Materials (Academic Press, N. Y. 1965).

Table 2 indicates magnetostrictive values for spinel ferrites with variations of divalent cations on the tetrahedral or octahedral sites.

TABLE 2

| | $\lambda_{100}$ | $\lambda_{111}$ |
|---|---|---|
| $M_nF^e{}_2{}^04$ | $-25 \times 10^{-6}$ | $+4.5 \times 10^{-6}$ |
| $FeFe_2O_4$ | $-20 \times 10^{-6}$ | $+78 \times 10^{-6}$ |
| $NiFe_2O_4$ | $-46 \times 10^{-6}$ | $+22 \times 10^{-6}$ |
| $Ni_{0.8}Fe_{0.2}Fe_2O_4$ | $-36 \times 10^{-6}$ | $-4 \times 10^{-6}$ |
| $Co_{0.8}Fe_{0.2}Fe_2O_4$ | $-590 \times 10^{-6}$ | $+120 \times 10^{-6}$ |

In contrast with bubble devices which depend for their unique anisotropy on growth-induced effects, materials of the invention need contain no more than a single ion in any particular crystallographic site (suitable materials are those in which uniaxial properties have been produced by strain as, for example, epitaxial films of magnetic garnets prepared by chemical vapor deposition — it may be noted that either sign of magnetostriction is appropriate to the present invention, the desired effect resulting from increasee or reduction in anisotropy which implies that the bubbles can have a lower energy state in either the implanted or unimplanted regions of the material under treatment. Since the requirement for uniaxiality is met by relatively simple compositional considerations, there is considerable flexibility remaining to prescribed compositional variations for satisfying other device requirements, e.g., temperature stability, magnetization, etc.

It is implicit that the material surface crystallographic direction is flexible. Desired directions are, of course, determined, first of all, by the magnitude and sign of the magnetostriction in those directions and, secondly, on the desired device properties. In the garnet systems, it is usual to prescribe easy magnetic directions corresponding with <100>, <111> and <110>.

It has been indicated that the mechanism considered primarily responsible for the effects reported involves the strain responsive to the stress set up between the crystallographic regions evidencing differing lattice parameters. In general, these differing parameters are due solely to the expansion effect attributed to the implanted ionic species. In other instances, however, implantation may be utilized merely to tailor an otherwise present strain effect. Accordingly, the inventive processes may be practiced on epitaxial layers already having a pronounced uniaxiality due to strain. Other epitaxial materials which may have a uniaxiality associated with growth or which may manifest little directionality are, of course, also usable. Even within such composite structures reliance may be had upon a strain effect within an initially compositionally homogeneous region as within two adjacent portions of an epitaxial layer. The invention has been described in terms of a strain effect associated with an inhomogeneous expansion in lattice parameter within a material having at least a minimal net magnetostriction in a relevant direction. The possibility exists also that anisotropy may be caused by the directional nature of the bombardment and of the resulting damage, or by a type of "magnetic annealing" if a magnetic field is applied during the bombardment.

4. Examples

Example 1

A specimen of the composition $Eu_2Er_1Fe_{4.3}Ga_{0.7}O_{12}$ representing a wafer of the approximate dimensions 0.2 by 0.4 by 0.005 in. which was cut from a bulk-grown crystal with growth occurring under the (110) facet, was annealed at about 1250 degrees C in oxygen for about 16 hours and was then subjected to implantation over a portion of one surface by a proton source at an energy centering about 300 keV having a spectrum of about 295 keV to 305 keV for a period of about 1/2 hour (representing a dosage of about $1 \times 10^{17}$ per $cm^2$). The sample evidenced no uniaxiality after annealing, but implantation processing resulted in a unique anisotropy of the order of $8 \times 10^4$ ergs per cc, the easy axis being perpendicular to the major surface. Magnetic bubbles (approximately cylindrical domains of polarity opposite to that of the surrounding region) were produced and supported by application of a normal bias field of about 60 oersteds.

Example 2

Utilizing an epitaxial sample consisting of a 3.5 micrometer thick layer of $Tb_{2.4}Er_{0.6}Fe_5O_{12}$ on 250 micrometer substrate of $Sm_3Ga_5O_{12}$, the epitaxial surface was implanted with protons at an energy of about 300 $\pm$ 5 keV with a resulting dosage of about $1 \times 10^{17}$ per $cm^2$. The effect of the treatment was to produce a profile such that a strained region of a thickness of about 2 micrometers centering at a depth of about 2 micrometers evidenced a unique anisotropy normal to the surface. The sandwich regions within the epitaxial layer manifested magnetic easy direction in the plane. Here, again, it was found that bubbles could be supported by application of a field of about 100 oersteds and propagated by application of small field gradients in the usual manner.

Example 3

Example 2 is repeated, however, masking a portion of the surface with an absorber of molybdenum having a thickness of the order of $5 \times 10^{-3}$ inches. The unique anisotropy described in Example 2 was produced only in the unmasked regions with the portion of the layer under the absorber having magnetic properties substantially unaltered from the unprocessed sample.

Example 4

Whereas the above examples all utilized a net positive magnetostriction in the orthogonal direction, the general procedure described under Example 2 was repeated, however, with an epitaxial layer composition $Y_3FeGaO_{12}$ on a (111) substrate of $Dy_{.75}Ga_{2.25}Ga_5O_{12}$ manifesting a negative magnetostriction of the order of $2 \times 10^{-6}$. The unprocessed material had sufficient unique anisotropy normal to the major surface to permit bubble formation and propagation. Irradiation under the conditions noted was sufficient to rotate the easy direction to an in-plane direction.

Example 5

A bulk sample of a spinel ferrite of the composition $CoFe_2O_4$ evidencing no perceptible unique anisotropy was irradiated with proton energy approximately 100 keV, dosage approximately 2 33 $10^{17}$, with the result that the irradiated portions evidenced sufficient unique anisotropy normal to the irradiated surface to permit bubble formation and propagation.

What is claimed is:

1. Process for altering magnetic anisotropy in a magnetic material of a crystalline structure of the group consisting of garnet and spinnel ferrites, characterized in that at least a portion of at least one surface of such material is bombarded by ions having an energy of at least 10 keV for time sufficient to produce a dosage of at least about $10^{15}$ ions per square centimeter so as to produce an expansion in lattice parameter, the magnitude of which is dependent upon the degree of absorption of such ions.

2. Process of claim 1 in which the said material evidences a net magnetostriction of approximately at least $1 \times 10^{-6}$.

3. Process of claim 2 in which the energy spectrum is such as to result in inhomogeneous ionic absorption in the direction of penetration.

4. Process of claim 2 in which at least a portion of the said irradiation is in a direction corresponding with the channeling direction for the said material.

5. Device produced in accordance with the process of claim 2.

6. Process of claim 2 in which the ionic species is hydrogen.

7. Process of claim 2 in which the sign of the said magnetostriction is positive.

8. Process of claim 7 in which the direction of the said positive magnetostriction is approximately orthogonal to the surface being bombarded.

9. Process of claim 2 in which the said material is essentially homogeneous.

10. Process of claim 9 in which the said material is a portion of a bulk-grown crystal.

11. Process of claim 2 in which the said material comprises a layer on a supporting substrate.

12. Process of claim 11 in which the said layer is crystallographically epitaxial with respect to the said substrate.

13. Process of claim 12 in which the said layer is produced by liquid-phase epitaxy.

14. Process of claim 12 in which the said layer is produced by chemical vapor deposition.

15. Process of claim 12 in which the said layer evidences unique magnetic anisotropy prior to treatment.

16. Process of claim 2 in which the irradiated surface of the said material is subjected to a variation in dosage.

17. Process of claim 16 in which the said variation results by use of masking.

18. Process of claim 16 where such variation results primarily by selective illumination utilizing a beam of cross-section small relative to the surface being irradiated.

19. Process of claim 16 in which the variation is such as to produce a pattern corresponding with a relatively low coercivity region in which domain wall movement is favored.

20. Process of claim 2 in which the said magnetic material is of an oxidic composition.

21. Process of claim 20 in which the said material is a ferrimagnetic material of the garnet structure.

22. Process of claim 20 in which the said material is a magnetic ferrite of the spinel structure.

* * * * *

UNITED STATES PATENT OFFICE
CERTIFICATE OF CORRECTION

Patent No. 3,792,452 Dated February 12, 1974

Inventor(s) Melvyn Dixon, Robert A. Moline, James C. North, Lawrence J. Varnerin, Jr., and Raymond Wolfe It is certified that error appears in the above-identified patent and that said Letters Patent are hereby corrected as shown below:

Column 1, line 19, after "are" insert --generally planar in configuration and are constructed of--.

Column 4, lines 34-36, cancel the sentence: "That operation is described in detail in the above mentioned application of Bobeck."

Column 7, line 7, delete "imhomogeneously" and substitute --inhomogeneously--.

Column 8, line 31, TABLE 2, delete "$M_nFe_2O_4$" and substitute --$MnFe_2O_4$--.

Column 8, line 45, delete "increasee" and substitute --increase--.

Signed and sealed this 10th day of September 1974.

(SEAL)
Attest:

McCOY M. GIBSON, JR.
Attesting Officer

C. MARSHALL DANN
Commissioner of Patents